(12) United States Patent
Miyata et al.

(10) Patent No.: US 6,611,388 B1
(45) Date of Patent: Aug. 26, 2003

(54) MASTER INFORMATION MAGNETIC RECORDER

(75) Inventors: Keizo Miyata, Osaka (JP); Tatsuaki Ishida, Osaka (JP); Taizou Hamada, Osaka (JP); Kiyokazu Tohma, Osaka (JP); Hiroshi Ryonai, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/646,138

(22) PCT Filed: Mar. 18, 1999

(86) PCT No.: PCT/JP99/01375

§ 371 (c)(1),
(2), (4) Date: Sep. 13, 2000

(87) PCT Pub. No.: WO99/49456

PCT Pub. Date: Sep. 30, 1999

(30) Foreign Application Priority Data

Mar. 23, 1998 (JP) ............................................. 10-074670

(51) Int. Cl.⁷ .................................................. G11B 5/86
(52) U.S. Cl. ............................................................ 360/17
(58) Field of Search ............................. 360/15, 16, 17; 369/84

(56) References Cited

U.S. PATENT DOCUMENTS

| 3,381,085 A | 4/1968 | Johnson et al. |
|---|---|---|
| 3,641,280 A | 2/1972 | Browder |
| 3,844,907 A | 10/1974 | Kitamoto et al. |
| 3,869,711 A | 3/1975 | Bernard et al. |
| 3,982,276 A | 9/1976 | Roos |
| 4,071,869 A | 1/1978 | Feierabend et al. |
| 4,277,806 A | 7/1981 | Jeffers et al. |
| 4,363,038 A | 12/1982 | Fayling |
| 4,422,106 A | 12/1983 | Sawazaki |
| 4,525,828 A | 7/1985 | Higashiyama et al. |

(List continued on next page.)

FOREIGN PATENT DOCUMENTS

| EP | 0 131 985 | 1/1985 |
|---|---|---|
| EP | 0 655 734 | 5/1995 |
| EP | 0 915 456 | 5/1999 |
| EP | 1 128 363 | 8/2001 |
| GB | 2 164 483 | 3/1986 |
| JP | 49-5610 | 5/1972 |
| JP | 48-53704 | 7/1973 |

(List continued on next page.)

OTHER PUBLICATIONS

C. Denis Mee et al. *Magnetic Recording* (vol. III: Video, Audio, and Instrumentation Recording), Chapter 2, pp. 9405.
Tanaka et al., Characterization of Magnetizing Process for Pro–Embossed Servo Pattern of Plastic Hard Disks, IEEE Transaction on Magnetics, pp 4209–4211.
International Preliminary Examination Report.

*Primary Examiner*—Alan T. Faber
(74) *Attorney, Agent, or Firm*—Merchant & Gould P.C.

(57) ABSTRACT

A master-information magnetic recording apparatus for recording preformat information signals into a magnetic recording medium using a ferromagnetic film pattern formed on a master information carrier, in which the pattern corresponds to the preformat information signals. With the master information carrier in contact with the magnetic recording medium, the ferromagnetic film pattern is magnetized by a magnetic field applying device. Thus, the preformat information signals are recorded into the magnetic recording medium. The magnetic field applying device is so constructed that the direction of magnetizing the ferromagnetic film pattern is perpendicular to a track-scanning orbit of a magnetic head in a recording and reproducing apparatus in which the magnetic recording medium is installed. It enables the magnetic head to gain sufficient reproduction amplitude for track-scanning for reproducing the information signals.

4 Claims, 12 Drawing Sheets

U.S. PATENT DOCUMENTS

| | | |
|---|---|---|
| RE32,464 E | 7/1987 | Aine |
| 4,725,899 A | 2/1988 | Gardner |
| 4,911,967 A | 3/1990 | Lazzari |
| 4,912,585 A | 3/1990 | Belser et al. |
| 5,032,931 A | 7/1991 | Suzuki et al. |
| 5,049,942 A | 9/1991 | Bujese |
| 5,121,258 A | 6/1992 | Chi et al. |
| 5,296,995 A | 3/1994 | Yonezawa et al. |
| 5,303,092 A | 4/1994 | Noda |
| 5,353,169 A | 10/1994 | Jeffers et al. |
| 5,426,535 A | 6/1995 | Bigelow et al. |
| 5,585,989 A | 12/1996 | Kuromiya et al. |
| 5,748,421 A | 5/1998 | Taki et al. |
| 5,898,553 A | 4/1999 | Oyanagi et al. |
| 5,991,104 A | 11/1999 | Bonyhard |
| 6,014,296 A | 1/2000 | Ichihara et al. |
| 6,088,200 A | 7/2000 | Morita |
| 6,309,802 B1 | 10/2001 | Bar-Gadda |
| 6,376,083 B1 | 4/2002 | Murayama et al. |
| 6,433,944 B1 | 8/2002 | Nagao et al. |
| 6,469,848 B1 | 10/2002 | Hamada et al. |
| 2002/0054442 A1 | 5/2002 | Nishikawa |

FOREIGN PATENT DOCUMENTS

| | | |
|---|---|---|
| JP | 50-60212 | 5/1975 |
| JP | 51-25723 | 8/1976 |
| JP | 55-12545 | 1/1980 |
| JP | 55-70935 | 5/1980 |
| JP | 56-7243 | 1/1981 |
| JP | 56-22219 | 3/1981 |
| JP | 56-41528 | 4/1981 |
| JP | 56-68926 | 6/1981 |
| JP | 57-8921 | 2/1982 |
| JP | 57-24032 | 2/1982 |
| JP | 57-109133 | 7/1982 |
| JP | 57-109134 | 7/1982 |
| JP | 57-138061 | 8/1982 |
| JP | 57-158004 | 9/1982 |
| JP | 57-158038 | 9/1982 |
| JP | 57-158039 | 9/1982 |
| JP | 57-158040 | 9/1982 |
| JP | 57-158041 | 9/1982 |
| JP | 58-26328 | 2/1983 |
| JP | 58-94136 | 6/1983 |
| JP | 58-94137 | 6/1983 |
| JP | 60-22733 | 2/1985 |
| JP | 60-209915 | 10/1985 |
| JP | 61-66215 | 4/1986 |
| JP | 61-190719 | 8/1986 |
| JP | 62-124622 | 6/1987 |
| JP | 62-208430 | 9/1987 |
| JP | 62-264432 | 11/1987 |
| JP | 63-811 | 1/1988 |
| JP | 63-175229 | 7/1988 |
| JP | 63-183623 | 7/1988 |
| JP | 1-88921 | 4/1989 |
| JP | 64-88921 | 4/1989 |
| JP | 2-94111 | 4/1990 |
| JP | 2-98820 | 4/1990 |
| JP | 2-132630 | 5/1990 |
| JP | 2-214023 | 8/1990 |
| JP | 2-301018 | 12/1990 |
| JP | 3-256223 | 11/1991 |
| JP | 4-13220 | 1/1992 |
| JP | 4-134629 | 5/1992 |
| JP | 4-251435 | 9/1992 |
| JP | 4-251440 | 9/1992 |
| JP | 7-44858 | 2/1995 |
| JP | 7-78337 | 3/1995 |
| JP | 9-138927 | 5/1997 |
| JP | 10-40544 | 2/1998 |
| JP | 10-162360 | 6/1998 |
| JP | 63-166023 | 7/1998 |
| JP | 10-269566 | 10/1998 |
| JP | 11-25455 | 1/1999 |
| JP | 11-175973 | 7/1999 |
| JP | 2001-14667 | 1/2001 |
| WO | WO 91/16706 | 10/1991 |

MASTER INFORMATION MAGNETIC RECORDER

TECHNICAL FIELD

The present invention relates to a master-information magnetic recording apparatus for recording predetermined master information signals, using a master information carrier, on a magnetic recording medium used in a magnetic recording/reproducing apparatus with large capacity and high recording density.

BACKGROUND ART

A magnetic recording/reproducing apparatus has been increasing in recording density in order to achieve its small size and large capacity. Especially, in the field of a hard disk drive as a typical magnetic recording/reproducing apparatus, apparatuses with an areal recording density of more than five gigabits per square inch (7.75 Mbits/mm$^2$) are already available on the market. The practical use of apparatuses with an areal recording density of ten gigabits per square inch (15.5 Mbits/mm$^2$) is expected in a few years. Thus, the technique in this field has been progressing rapidly.

One of the technical features that has enabled such high recording density is the increasing track recording density due to the improvements of magnetic recording media, performance of a head-disk interface, and the like and the advent of a new signal processing method such as "partial response". However, recently the rate of increase in track density exceeds that of track recording density greatly, which is a primary factor for the increase in areal recording density. Practical use of a magneto-resistive type head, which is superior to a conventional inductive type magnetic head in reproduction-amplitude performance by far, has contributed to the increase in track density, and has enabled the reproduction of signals from a track whose width is a few microns or less with a high S/N ratio. It is expected that a track pitch will reach the sub micron range in the near future along with further improvement of the head performance.

A conventional hard disk drive has areas (hereafter referred to as "preformat recording areas") where master information signals such as a tracking servo signal, an address data signal, and a reproduction clock signal are recorded, so that a magnetic head can scan such a narrow track correctly and reproduce the signals with a high S/N ratio. The preformat recording areas are spaced at predetermined angles over the circumference of a disk, that is, over 360 degrees. The magnetic head reproduces such signals every redetermined period to verify its position and corrects its displacement in a radial direction of magnetic disk as required, thus scanning a track correctly.

The master information signals such as a tracking servo signal, an address data signal, and a reproduction clock signal are to be reference signals for the magnetic head to scan a track correctly. Therefore, precise track-positioning accuracy is required in recording the signals. In a conventional hard disk drive, a magnetic disk and a magnetic head are incorporated into a drive in advance. Then the master information signals are recorded with the unique magnetic head incorporated in the drive, using a special servo track recording apparatus. In this case, the preformat recording is performed while an external actuator equipped with the servo track recording apparatus precisely controls the position of the unique magnetic head incorporated in the drive, thus securing the required track-positioning accuracy.

However, the above mentioned preformat recording with the unique magnetic head incorporated in the drive using the special servo track recording apparatus in the prior art has some problems as follows.

The first problem is that the preformat recording requires a long time in the above-mentioned method, since the recording using a magnetic head is basically linear recording by utilizing relative movement between the magnetic head and a magnetic recording medium. In addition, the servo track recording apparatus is quite expensive, thus increasing the cost required for the preformat recording.

The first problem would become more serious along with the increase in track density in the magnetic recording/reproducing apparatus. In addition to the increase in the number of tracks in the radial direction, the following reasons cause the increase in the time required for the preformat recording. That is, the more the track density increases, the greater the precision that is required for positioning the magnetic head. Therefore, preformat recording areas where the information signals such as the tracking servo signal and the like are recorded have to be located at a smaller angular interval over one rotation of the disk. Consequently, the preformat information signals to be recorded in the disk increase as the recording density increases. Thus, more time is required for the preformat recording.

Although the magnetic disk media have tended to be decreased in diameter, disks with a large diameter of 3.5 or 5 inches are still in demand. In a disk, the larger the recording area is, the more the preformat information signals to be recorded increase. The time required for the preformat recording greatly influences the cost performance of such large disks.

The second problem is that due to the space between the magnetic head and the magnetic recording medium and diffusion of the recording magnetic field caused by the shape of a pole provided at the tip of the magnetic head, magnetization at the track edges of the recorded preformat signals lacks steepness in transition.

Figure 2:
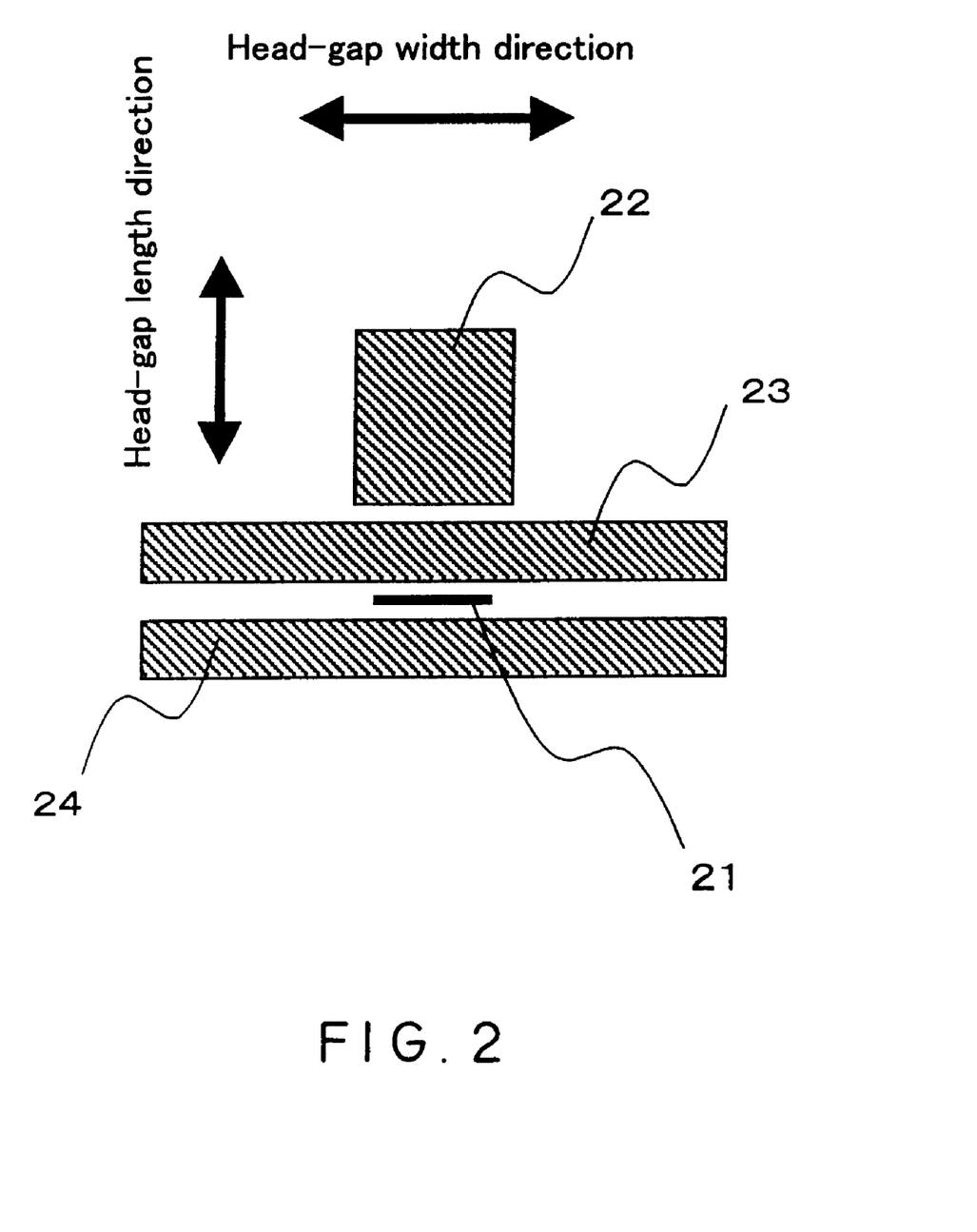
FIG. 2 is a plan view showing a schematic configuration of a magnetic head for recording and reproducing information signals provided in the hard disk drive.

The recording using a magnetic head is basically dynamic linear recording by utilizing relative movement between the magnetic head and a magnetic recording medium. Therefore, a certain space between the magnetic head and the magnetic recording medium cannot be avoided in view of the interface performance between them. Further, as shown in FIG. 2, a conventional magnetic head usually has two components performing recording and reproduction respectively. Consequently, the width of a pole 22 at a trailing edge of a recording gap corresponds to a recording track width, and the width of a pole 23 at a leading edge is several times larger than the recording track width.

Both the two conditions mentioned above may cause the diffusive recording magnetic field at recording track edges. As a result, such problems occur that the magnetization at the track edges of the recorded preformat signals lacks steepness in transition or erased areas appear on both sides of a track edge. In a current tracking servo technique, magnetic-head position is detected based on a change amount of reproduction amplitude when the magnetic head deviates from a track to scan. Therefore, it is required not only that the magnetic head scan a track correctly with a high S/N ratio as in reproducing data signals, but also that the amount of reproduction amplitude is steeply changed when the magnetic head deviates from a track to scan, i.e. the off-track characteristic is steep. Consequently, when a magnetization at an edge of a track of the preformat signals lacks steepness in transition, it is difficult to realize the precise tracking servo technique that is required for a submicron track recording in the future.

In order to solve the aforementioned two problems in the preformat recording using a magnetic head, Japanese Laid-open Patent Publication (Tokkai Hei) No. 10-40544 proposes a new preformat recording technique. In this technique, a master information carrier is prepared, which comprises a substrate on which a ferromagnetic film pattern corresponding to preformat information signals is formed. The surface of the master information carrier is brought into contact with a surface of a magnetic recording medium. Then, the ferromagnetic film pattern formed on the master information carrier is magnetized, thus recording a magnetized pattern corresponding to the ferromagnetic film pattern into the magnetic recording medium. According to this preformat recording technique, an excellent preformat recording can be performed efficiently with no sacrifice in other important performance such as S/N ratio of the recording medium and interface performance.

Figure 1:
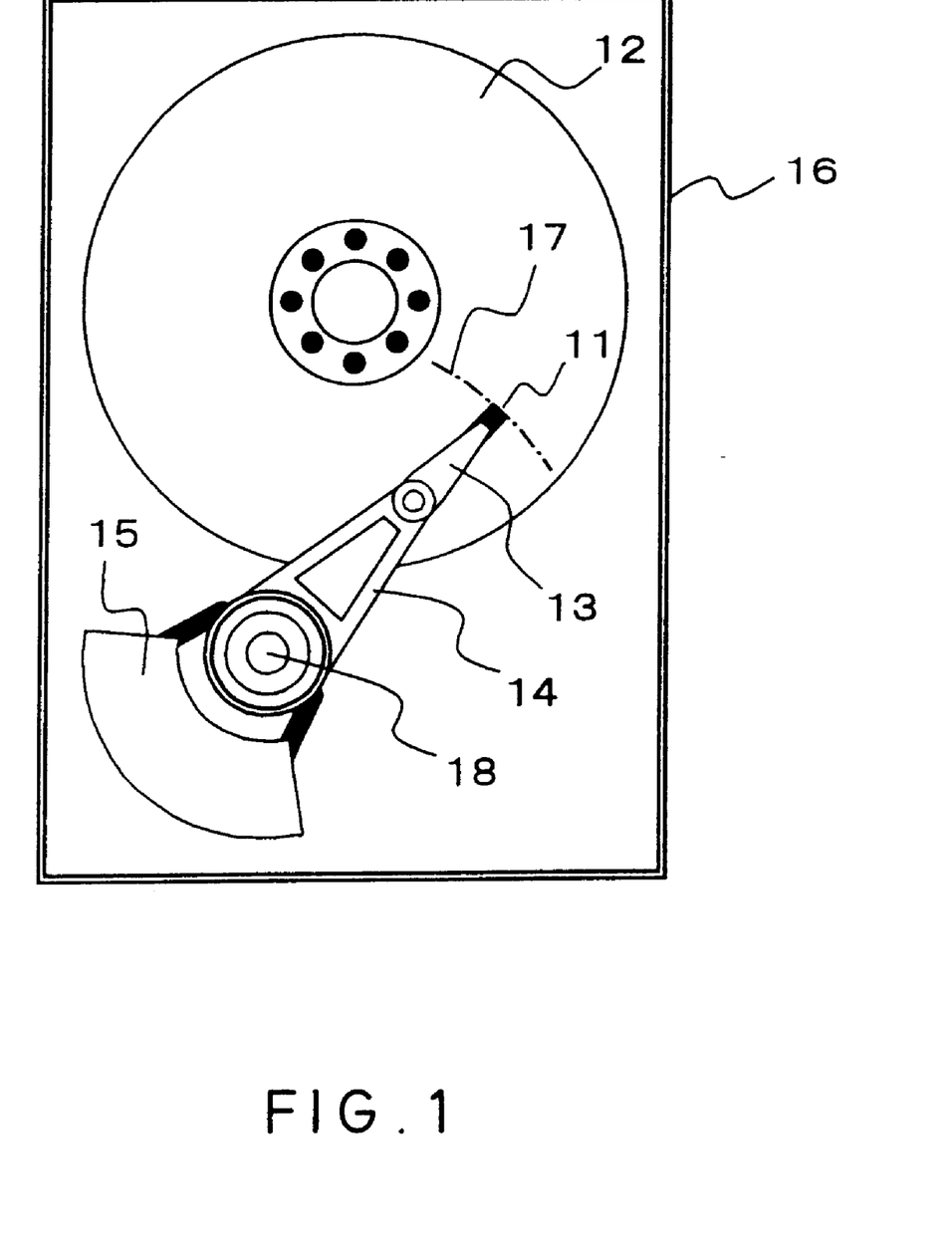
FIG. 1 is a plan view showing a schematic configuration of a common hard disk drive.

FIG. 2 shows a configuration of a magnetic head incorporated in a common hard disk drive and is a plan view seen from the face of the magnetic head that opposes a magnetic disk. The magnetic head comprises a recording head formed of a pole 22 at a trailing edge and a pole 23 at a leading edge, a reproducing element 21, and a lower shield 24. In this case, in an in-plane in which the magnetic head opposes the magnetic disk, "a head-gap length direction" is defined as the direction in which the lower shield 24, the reproducing apparatus 21, and the poles 23 and 22 are arranged sequentially. Similarly "a head-gap width direction" is defined as the direction perpendicular thereto. FIG. 1 is a plan view showing a schematic configuration of a common hard disk drive.

Figure 3:
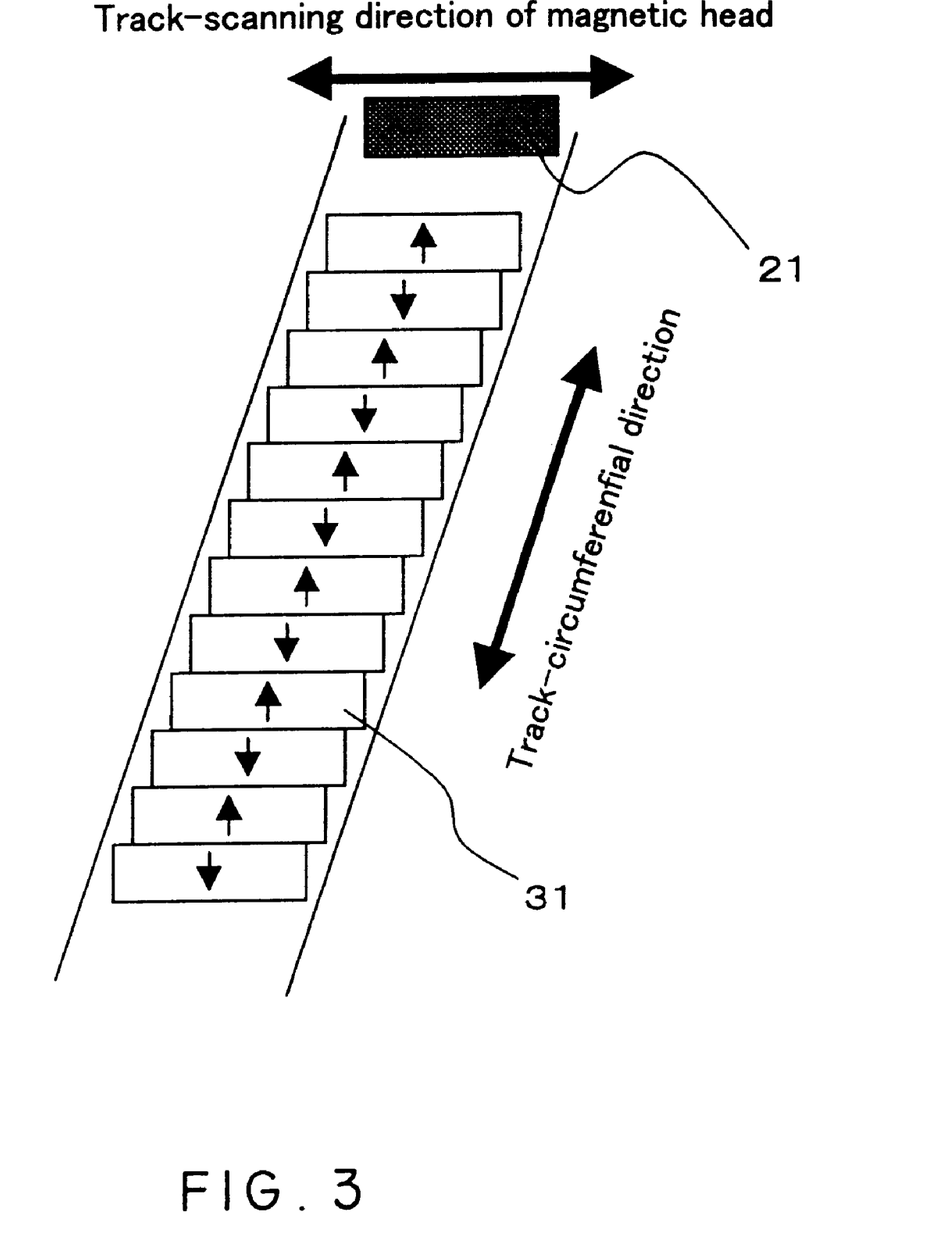
FIG. 3 is a view showing the magnetized direction of recorded bits on a hard disk and a track-scanning direction of the magnetic head for recording and reproduction provided in the hard disk drive.

As shown in FIG. 1, when a magnetic head 11 mounted on a head suspension 13 scans tracks on a magnetic disk, the magnetic head 11 is moved on an orbit shown by the alternating long and short dash line 17 in FIG. 1 by a voice coil motor 15. The orbit generally has a circular-arc shape taken with a rotation axis 18 of a head actuator as its center. The tangential direction at arbitrary points on the circular arc substantially coincides with the head-gap width direction. This tangential direction is defined as the "track-scanning direction". FIG. 3 is an enlarged view of a part of a recording track on a magnetic disk 12. Generally, the magnetized direction of bits 31 recorded in the magnetic disk 12 coincides with the head-gap length direction and is perpendicular at every portion to the head-gap width length, i.e. the track-scanning direction of the magnetic head 11.

Therefore, in order to allow the preformat recording technique using a master information carrier to be really effective, it is preferable that the magnetized direction of a ferromagnetic film pattern formed on the master information carrier and the head-gap length direction coincide with each other in preformat recording. That is to say, it is preferable that the magnetized direction of the ferromagnetic film is perpendicular at every portion to the track-scanning direction of the magnetic head in every track on the magnetic disk. When the preformat information signals recorded in the magnetic disk are reproduced using a magnetic head, the magnetic head detects the change in magnetization in the head-gap length direction. Therefore, when the magnetized direction of the ferromagnetic film does not coincide with the head-gap length direction, the reproduction amplitude decreases, which might hinder excellent track-scanning by the magnetic head. The term "track-scanning" used herein means the scanning performed across tracks.

Thus, it is important that a device for applying a magnetic field used for recording preformat information signals can adjust the applied magnetic field to correspond to a circular-arc orbit of the magnetic head in track-scanning.

DISCLOSURE OF INVENTION

The present invention aims to solve the aforementioned problems in the prior art. It is an object of the present invention to provide a master-information magnetic recording apparatus enabling highly reliable preformat recording. In more detail, the object is to provide the master-information magnetic recording apparatus in which when magnetizing a ferromagnetic film pattern formed on a master information carrier, the magnetizing direction of recording bits of the ferromagnetic film pattern coincides with a head-gap length direction of a magnetic head in a magnetic recording/reproducing apparatus.

In order to attain the aforementioned object, the master-information magnetic recording apparatus according to the present invention has a construction as follows: The apparatus has a construction for recording predetermined information signals into a magnetic recording medium having a ferromagnetic layer, by using a master information carrier comprising a substrate on which a ferromagnetic film pattern corresponding to predetermined information signals is formed. The apparatus comprises a support for holding a magnetic recording medium in contact with the master information carrier; and means for applying a magnetic field to the master information carrier to magnetize the ferromagnetic film pattern. The direction of the applied magnetic field being perpendicular to a circular-arc path on the magnetic recording medium along which a magnetic head scans tracks in a magnetic recording/reproducing apparatus into which the magnetic recording medium is installed.

Such a construction allows the magnetized direction of the recorded bits of the preformat information signals on the magnetic recording medium to coincide with the head-gap length direction of the magnetic head in the magnetic recording/reproducing apparatus, thus enabling the preformat recording that permits sufficient reproduction amplitude for track-scanning by the magnetic head in the magnetic recording/reproducing apparatus to be obtained.

The device for applying a magnetic field can be a bar-like permanent magnet with a center axis curved along the circular-arc orbit and its magnetizing direction perpendicular to the center axis.

Further, the device for applying a magnetic field can be a large magnetic head having a pair of bar-like magnetic bodies opposing each other, between which a center axis curved along the circular-arc orbit is located, and a coil wound around at least one of the bar-like magnetic bodies, and its magnetizing direction is perpendicular to the center axis.

Both the constructions mentioned above allow the magnetized direction of the recorded bits of the preformat information signals on the magnetic recording medium to coincide with the head-gap length direction, thus enabling the preformat recording that permits sufficient reproduction amplitude for track-scanning by the magnetic head in the magnetic recording/reproducing apparatus to be obtained.

BEST MODE FOR CARRYING OUT THE INVENTION

First Embodiment

Figure 6:
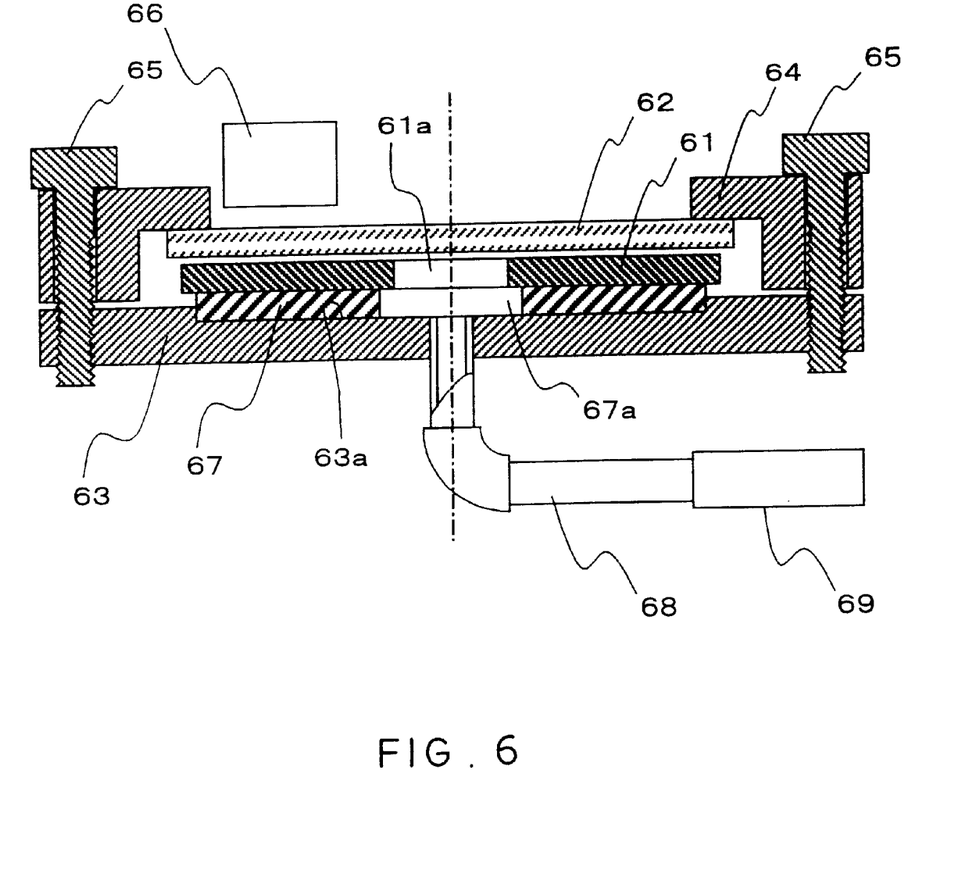
FIG. 6 is a cross-sectional view showing a master-information magnetic recording apparatus in the first embodiment of the present invention.

FIG. 6 is a cross-sectional view showing a master-information magnetic recording apparatus of a first embodiment according to the present invention. A circular recessed portion 63a is formed at the center of a lower plate 63. In the recessed portion 63a, a circular elastic plate 67 is placed. On the elastic plate 67, a hard disk 61 is positioned, and a master information carrier 62 is placed on the hard disk 61. Center holes 61a and 67a are formed at the centers of the hard disk 61 and the elastic plate 67, respectively. A suction pipe 68 is connected to the lower plate 63 at its center, and is continuous with the center hole 61a of the hard disk 61 and the center hole 67a of the elastic plate 67. An air suction device 69 is provided at an end of the suction pipe 68. When the air suction device 69 starts operating, the master information carrier 62 is drawn toward the hard disk 61, since air between the master information carrier 62 and the hard disk 61 is sucked out. An upper flange 64 presses the upper surface of the master information carrier 62 at the periphery, resulting in a uniform contact between the hard disk 61 and the master information carrier 62. In this case, the lower plate 63 and the upper flange 64 are fixed with bolts 65. A numeral 66 denotes a permanent magnet as a device for applying a magnetic field. Using this permanent magnet 66, preformat information signals are recorded into the hard disk 61.

Figure 4:
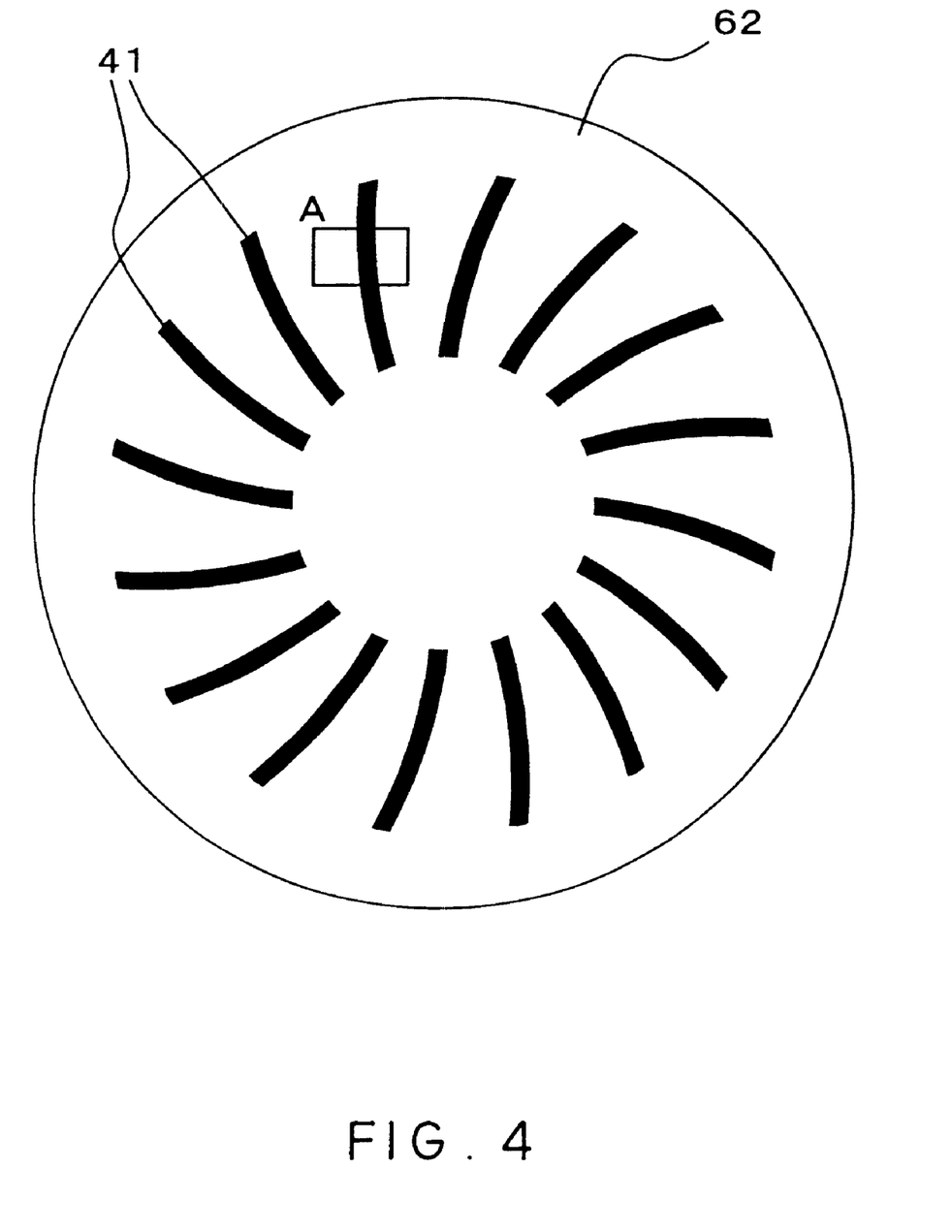
FIG. 4 is a plan view showing a schematic configuration of a master information carrier in a first embodiment of the present invention.
Figure 5:
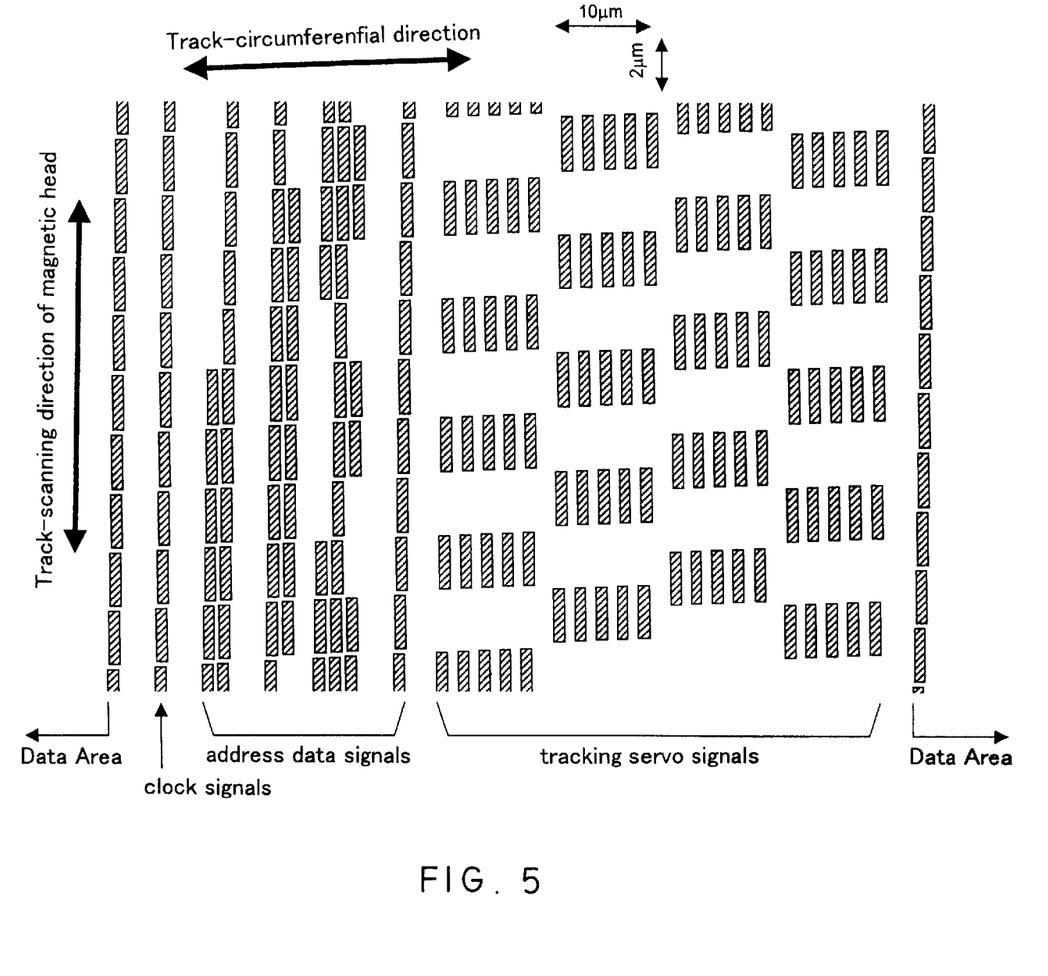
FIG. 5 is a view showing an example of embossed patterns corresponding to preformat information signals formed on a surface of the master information carrier.

As shown in FIG. 4, areas 41 are provided on the surface of the master information carrier 62 and are spaced at a predetermined angular interval. The areas 41 have a fine embossed pattern formed corresponding to the preformat information signals. An area A of a part of the areas 41 in FIG. 4 is shown in FIG. 5 in an enlarged scale. As shown in FIG. 5, the embossed patterns corresponding to a tracking servo signal, an address data signal, and a reproduction clock signal are arranged sequentially in the track-circumferential direction. Similarly, the embossed patterns also are arranged transversely to the track-circumferential direction and along a track-scanning orbit of a magnetic head in a magnetic recording/reproducing apparatus. In FIG. 5, parts shown with hatching are protruding portions and their surfaces are formed of a ferromagnetic material such as Co.

A method of forming the fine embossed pattern corresponding to the information signals on the surface of the master information carrier will be explained as follows. A ferromagnetic film made of Co or the like is formed on a surface of a glass substrate with a fine surface roughness and an excellent flatness by a sputtering method. As a next step, a resist film is exposed and developed by a photolithographic method or another lithographic technique using a laser beam or an electron beam. Then, an embossed pattern is formed by dry etching or the like. Alternatively, the embossed pattern also can be formed by a so-called lift-off technology in which a resist film is formed on a surface of a glass substrate and is patterned, a ferromagnetic film made of Co or the like is formed, and then the resist film is removed.

The method of forming the embossed pattern on the surface of the master information carrier is not limited to the aforementioned methods. For example, the fine embossed pattern may be formed directly by using a laser, electron beam, or ion beam, or by machining. The method of forming the ferromagnetic film on the surface of the glass substrate also is not limited to the sputtering method. For instance, general methods of forming thin films that have been practiced such as vacuum deposition, ion plating, CVD, plating, or the like can be employed.

The material of the ferromagnetic film for forming the surfaces of the protruding portions of the embossed pattern on the master information carrier 62 is not limited to Co. Many kinds of magnetic materials can be used regardless of whether the material is a hard-magnetic material, a semihard magnetic material, or a soft magnetic material. In order to generate a sufficient recording magnetic field independently of the kind of magnetic recording medium into which master information signals are recorded, materials with higher saturation magnetic flux density are preferred. Particularly, in a magnetic disk with a high coercive force over 2000 oersted and a flexible disk with a thick magnetic layer, sufficient recording cannot be performed at a saturation magnetic flux density of 0.8 tesla or less in some cases. Therefore, magnetic materials with a saturation magnetic flux density of at least 0.8 tesla, preferably at least 1.0 tesla, are generally used.

The recessed portions of embossed pattern formed by the ferromagnetic film on the master information carrier 62 are preferably filled with non-magnetic solid material. The edge portions of the ferromagnetic film are protected thereby. That is, partial stress applied to the edges of the pattern of the ferromagnetic film when the master information carrier is contacted securely and repeatedly with magnetic disks for recording by using the atmospheric pressure is relieved. Thus, the ferromagnetic film can be prevented from being chipped. As a result, one master information carrier can be used for the recording of a considerable number of disks compared to conventional master information carriers, and thus, the life of the master information carrier can be extended. Further, the master information carrier can have a longer life by forming a hard protective film on the ferromagnetic film and non-magnetic solid material.

The recording apparatus is designed so that when magnetizing the ferromagnetic film on the protruding portions of the embossed pattern (a master information pattern) formed on the master information carrier 62 to record preformat information signals into the hard disk 61 as a magnetic recording medium, the direction of magnetizing the ferromagnetic film on the protruding portions coincides with the head-gap length direction of a magnetic head in a magnetic recording/reproducing apparatus. Substantially, the head-gap length direction is perpendicular to the track-scanning direction of the magnetic head in the magnetic recording/reproducing apparatus. Therefore, the direction of magnetizing the ferromagnetic film on the protruding portions is made perpendicular to the track-scanning direction of the magnetic head in the magnetic recording/reproducing apparatus.

Figure 7:
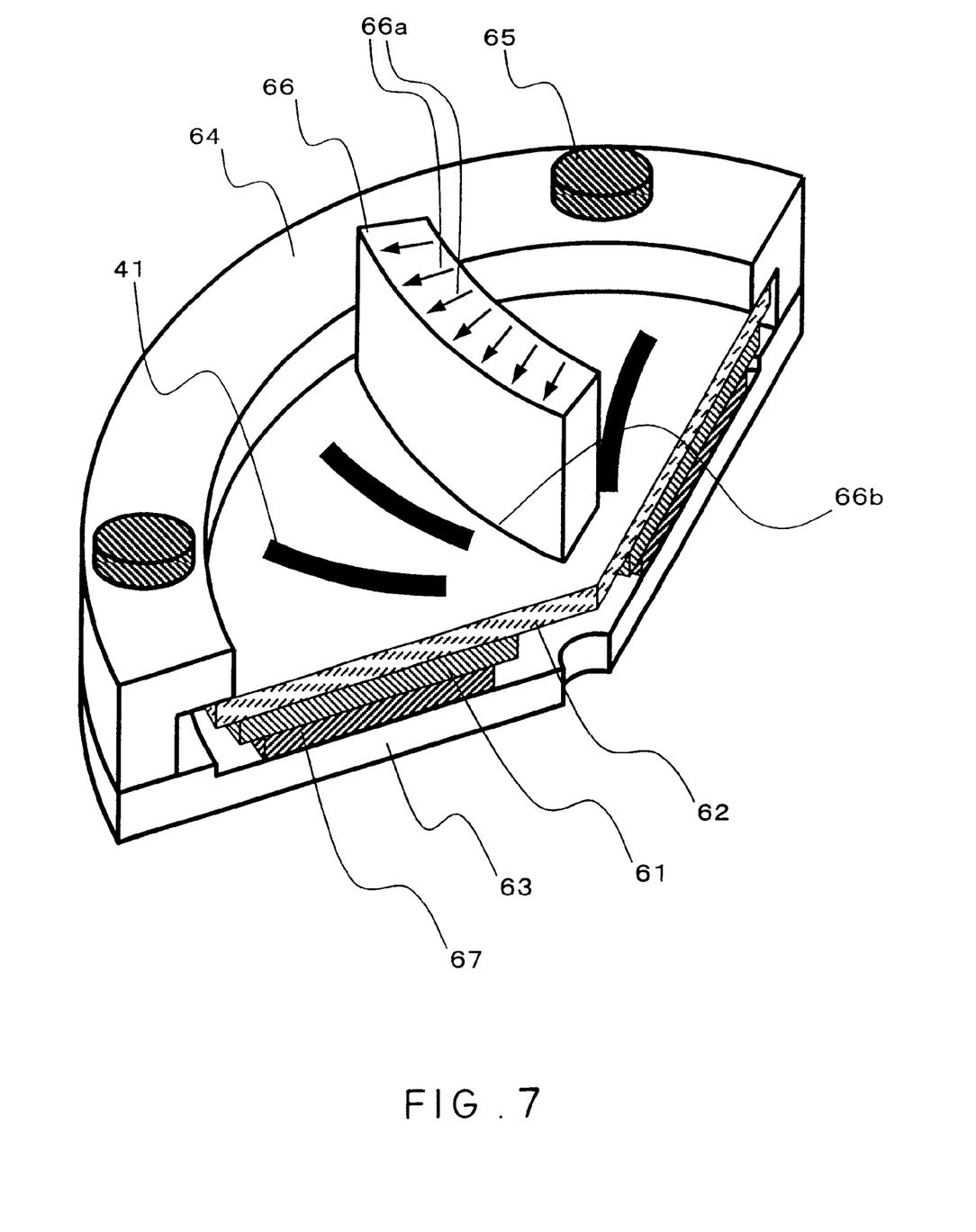
FIG. 7 is a perspective view showing the principal recording portion of the recording apparatus shown in FIG. 6, including a cross section of a part thereof.

FIG. 7 is a perspective view showing a part of the master-information magnetic recording apparatus shown in FIG. 6. In FIG. 7, the suction pipe 68 and the air suction device 69 are omitted. The permanent magnet 66 used for recording preformat information signals has a sectored face opposing the master information carrier 62. A side 66b of the sectored face has a circular-arc shape extending along the track-scanning orbit of the magnetic head in the magnetic recording/reproducing apparatus. As shown with an arrow 66a, the magnetizing direction of the permanent magnet 66 is parallel to the surface of the master information carrier 62 and perpendicular to the side 66b at every portion. The use of the permanent magnet 66 allows the ferromagnetic film on the protruding portions of the master information carrier 62 to be magnetized in the direction perpendicular to the track-scanning direction of the magnetic head in the magnetic recording/reproducing apparatus over all of the tracks. That is to say, the ferromagnetic film is magnetized in the same direction as the head-gap length direction of the magnetic head in the magnetic recording/reproducing apparatus.

Figure 8:
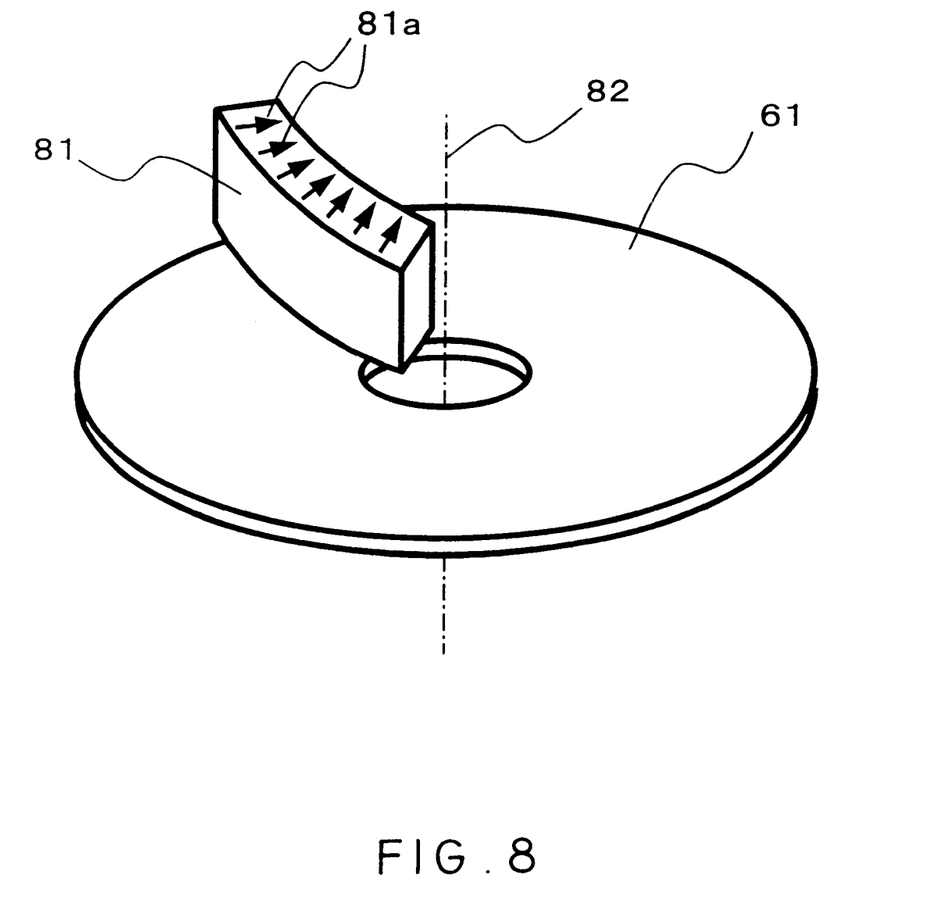
FIG. 8 is a perspective view showing an example of methods of initial magnetization of a magnetic recording medium into which information signals are recorded using the recording apparatus shown in FIG. 6.

The process of recording the information signals corresponding to the embossed pattern formed on the master information carrier into a hard disk as a magnetic recording medium will be explained with reference to FIGS. 6, 7, and 8.

In the first embodiment, as shown in FIG. 6, an atmospheric pressure is utilized for bringing the hard disk 61 and the master information carrier 62 into close contact with each other, which are mechanically pressed further to contact with each other using bolts 65, thus ensuring an entire and uniform contact between them. Then, the ferromagnetic film on the protruding portions of the embossed patterns formed on the master information carrier 62 is magnetized using the permanent magnet 66, thus recording the preformat information signals corresponding to the embossed pattern into the hard disk 61. The recording process will be explained further in detail as follows.

Before recording the information signals using the master information carrier 62, initial magnetization is carried out. As shown in FIG. 8, a permanent magnet 81 is rotated in parallel to the hard disk 61 about a center axis 82 of the hard disk 61, which is indicated with an alternating long and short dash line, with the permanent magnet 81 being positioned close to the hard disk 61, thus initializing the hard disk 61 (initial magnetization). The permanent magnet 81 has the same shape as that of the permanent magnet 66 used in recording preformat information signals. The magnetizing direction 82 of the permanent magnet 81 may be the same as or opposite to the magnetizing direction 66a of the permanent magnet 66. In the first embodiment, the magnetizing direction 82 is opposite to the magnetizing direction 66a.

As shown in FIG. 6, the elastic plate 67, the hard disk 61, and the master information carrier 62 are then superposed on the lower plate 63 sequentially so that the surface of the master information carrier 62 on which the embossed pattern is formed and the hard disk 61 come into contact with each other.

As a next step, the air suction device 69 is started. Air between the master information carrier 62 and the hard disk 61 is sucked out through the center hole 61a of the hard disk 61 and the center hole 67a of the elastic plate 67, and therefore the master information carrier 62 is forced toward the hard disk 61. An atmospheric pressure acts on the center portion of the master information carrier 62. In this condition, only the vicinity of the center portion of the master information carrier 62 is securely in contact with the hard disk 61, and the master information carrier 62 and the hard disk 61 may not be in secure contact with each other at their periphery. In order to obtain a secure contact between them at their periphery, the upper flange 64 is placed on the upper surface of the master information carrier 62 at the periphery. The upper flange 64 and the lower plate 63 are fixed with the bolts 65. In this case, by adjusting the fastening torque of the bolts 65, the hard disk 61 and the master information carrier 62 are pressed and come into contact with each other suitably, resulting in a uniform contact between them. Finally, the permanent magnet 66 is rotated in parallel to the master information carrier 62 about the alternating long and short dash line shown in FIG. 6 as the rotation center, thus applying a direct excition magnetic field to the entire surface of the master information carrier 62. Consequently, the ferromagnetic film on the protruding portions of the master information carrier 62 is magnetized, thus recording preformat information signals corresponding to the embossed pattern into the hard disk 61.

As described above, in the first embodiment, the direction of the magnetic field generated from the permanent magnet 66 is perpendicular to the track-scanning orbit of the magnetic head in the magnetic recording/reproducing apparatus. Therefore, in magnetizing the ferromagnetic film on the protruding portions of the master information carrier 62, its magnetized direction and the head-gap length direction of the magnetic head in the magnetic recording/reproducing apparatus are allowed to coincide with each other. As a result, it enables preformat recording that permits sufficient reproduction amplitude for track-scanning by the magnetic head in the magnetic recording/reproducing apparatus to be obtained.

In the above description, the mechanism for holding and rotating the permanent magnet 66 or 81 is omitted in the figures. However, a mechanism suitably selected from generally used methods can be used.

Second Embodiment

Figure 10:
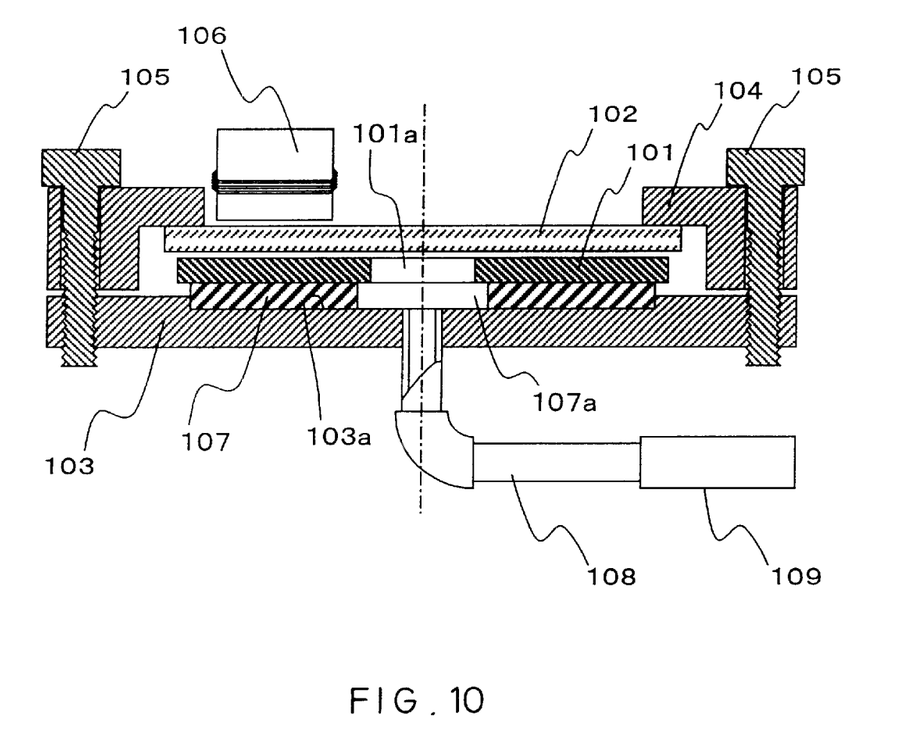
FIG. 10 is a cross-sectional view showing the master-information magnetic recording apparatus in the second embodiment of the present invention.

FIG. 10 is a cross-sectional view showing a master-information magnetic recording apparatus of a second embodiment according to the present invention. A circular recessed portion 103a is formed at the center of a lower plate 103. A circular elastic plate 107 is placed in the recessed portion 103a. On the elastic plate 107, a hard disk 101 is positioned, and a master information carrier 102 is placed on the hard disk 101. Center holes 101a and 107a are formed at the centers of the hard disk 101 and the elastic plate 107, respectively. A suction pipe 108 is connected to the lower plate 103 at its center, and is continuous with the center hole 101a of the hard disk 101 and the center hole 107a of the elastic plate 107. An air suction device 109 is provided at an end of the suction pipe 108. When the air suction device 109 starts operating, the master information carrier 102 is drawn toward the hard disk 101, since air between the master information carrier 102 and the hard disk 101 is sacked out. An upper flange 104 presses the upper surface of the master information carrier 102 at the periphery, resulting in a uniform contact between the hard disk 101 and the master information carrier 102. The lower plate 103 and the upper flange 104 are fixed with bolts 105. A numeral 106 denotes a large magnetic head provided in a device for applying a magnetic field. Using the large magnetic head 106, preformat information signals are recorded into the hard disk 101.

Figure 9:
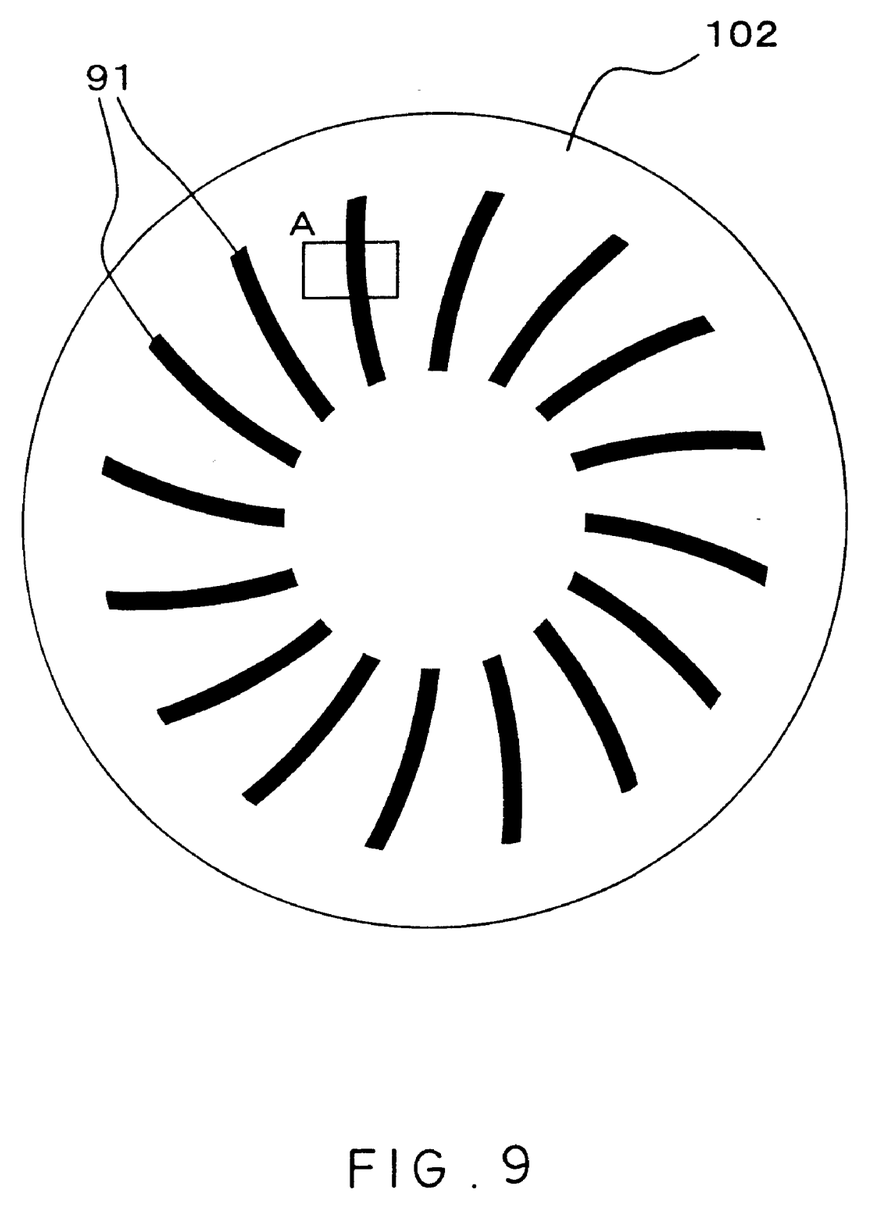
FIG. 9 is a plan view showing a schematic configuration of a master information carrier in a second embodiment of the present invention.

As shown in FIG. 9, areas 91 are provided on the surface of the master information carrier 102 and are spaced at a predetermined angular interval. The areas 91 have a fine embossed pattern formed corresponding to the preformat information signals. A concrete example of the embossed pattern formed in the areas 91 is the same as in the first embodiment as shown in FIG. 5. Such embossed pattern is formed by the same process as that described in the first embodiment.

As in the first embodiment, the recording apparatus is designed so that when magnetizing the ferromagnetic film on the protruding portions of the embossed pattern formed on a master information carrier 92 to record preformat information signals into the hard disk 101, the direction of magnetizing a ferromagnetic film on the protruding portions coincides with the head-gap length direction of a magnetic head (hereafter referred to as a "recording/reproducing magnetic head") provided in a magnetic recording/reproducing apparatus for reproducing the information signals recorded in a magnetic recording medium. Substantially, the head-gap length direction is perpendicular to the track-scanning direction of the recording/reproducing magnetic head. Therefore, the direction of magnetizing the ferromagnetic film on the protruding portions is made perpendicular to the track-scanning direction of the recording/reproducing magnetic head.

Figure 11:
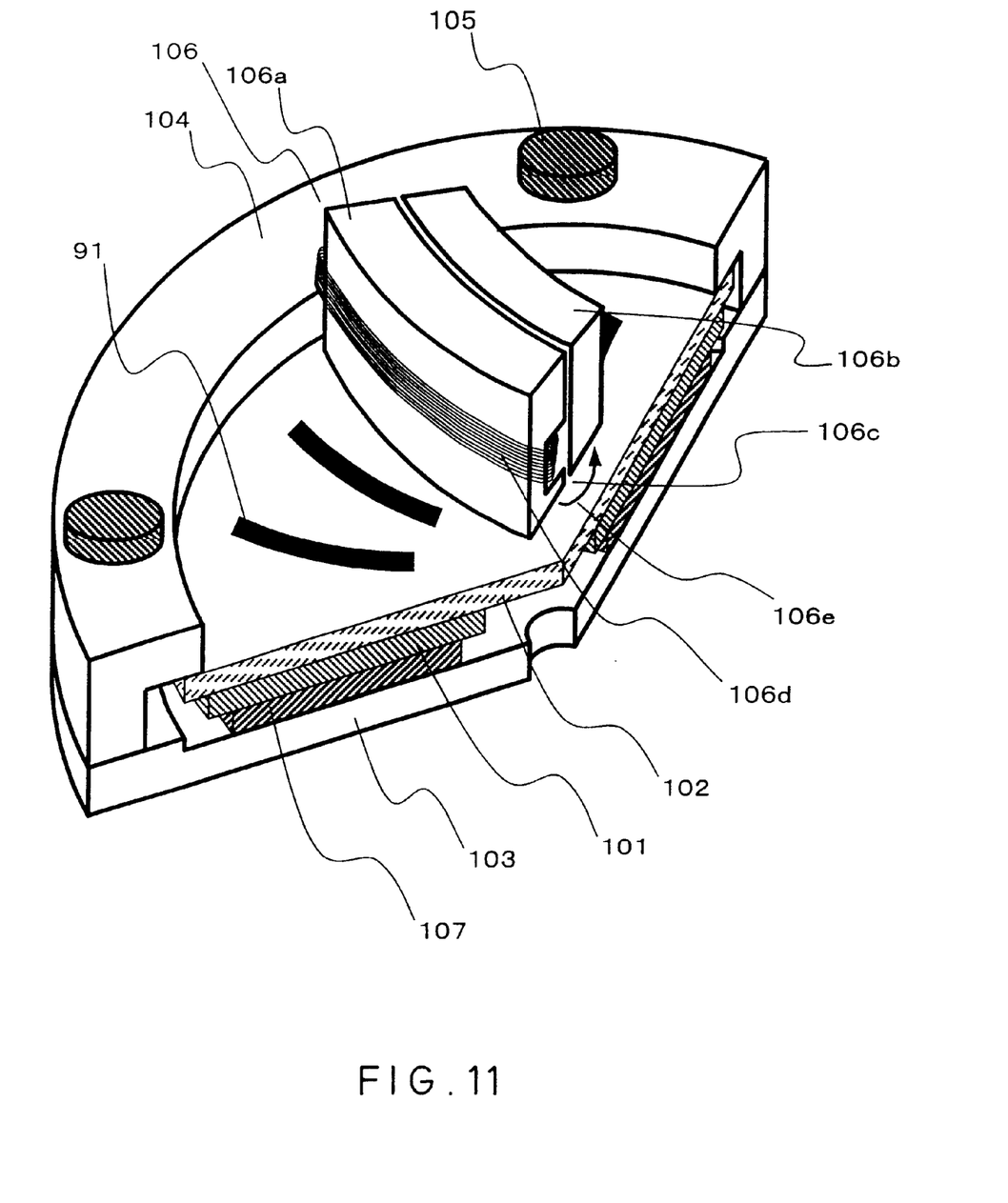
FIG. 11 is a perspective view showing the principal recording portion of the recording apparatus shown in FIG. 10, including a cross section of a part thereof.

FIG. 11 is a perspective view showing a part of the master-information magnetic recording apparatus shown in FIG. 10. In FIG. 11, the suction pipe 108 and the air suction device 109 are omitted. The large magnetic head 106 used for recording preformat information signals is formed of a magnetic core half body 106a with a coil 106d and a magnetic core half body 106b that are arranged opposing each other to provide a gap 106c. Application of current to the coil 106d generates a magnetic field 106e toward the magnetic core half body 106b from the magnetic core half body 106a at the gap 106c, as shown with an arrow 106e. By changing the direction for applying current, the direction of the magnetic field generated at the gap 106c can be changed. The gap 106c has a circular-arc shape being along a track-scanning orbit of the recording/reproducing magnetic head on the face opposing the master information carrier 102. Each of magnetic core half bodies 106a and 106b has a sectored face opposing the master information carrier 102. One side of each sectored face has a circular-arc shape being along a track-scanning orbit of the recording/reproducing magnetic head. Therefore, the direction of the magnetic field 106e generated at the gap 106c is perpendicular to the track-scanning orbit at every portion. The use of the large magnetic head 106 allows the ferromagnetic film on the protruding portions of the master information carrier 102 to be magnetized in the direction perpendicular to the track-scanning direction of the recording/reproducing magnetic head over all of the tracks. That is to say, the ferromagnetic film is magnetized in the same direction as the head-gap length direction of the recording/reproducing magnetic head.

Figure 12:
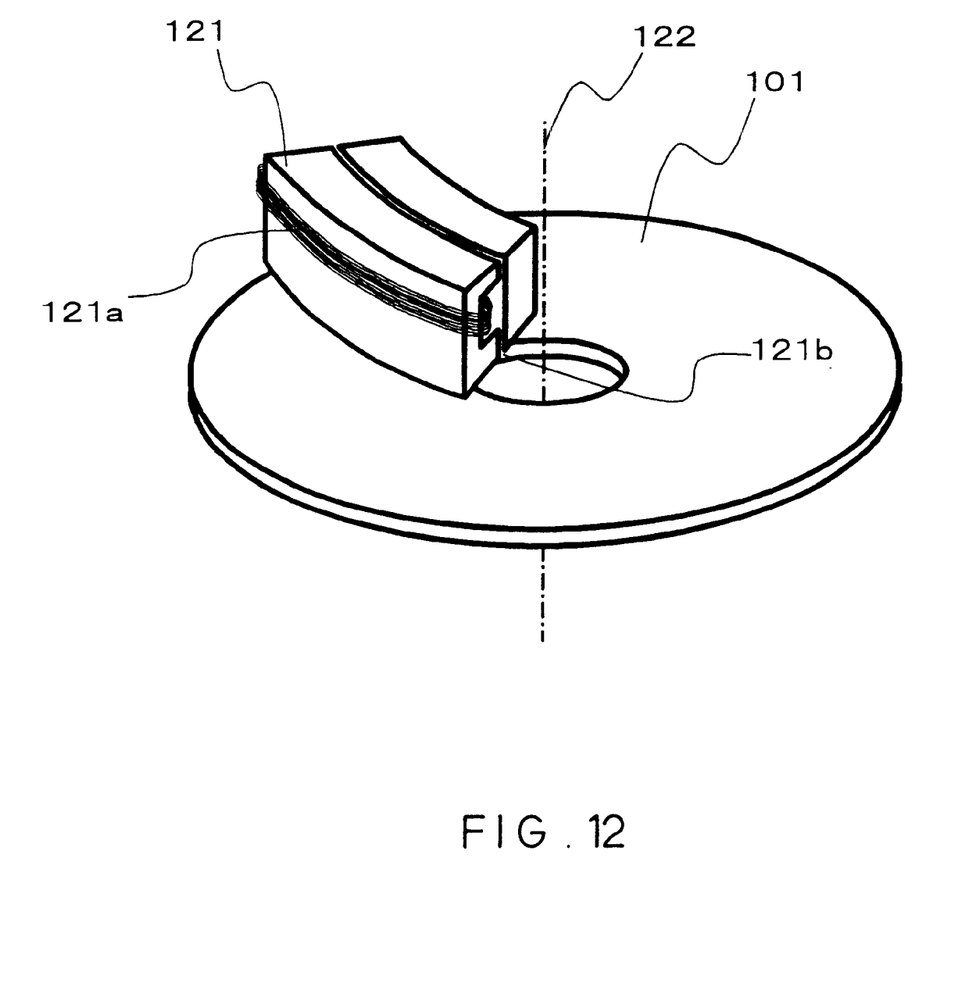
FIG. 12 is a perspective view showing an example of methods of initial magnetization of a magnetic recording medium into which information signals are recorded using the recording apparatus shown in FIG. 10.

The process of recording the information signals corresponding to the embossed pattern formed on the master information carrier into the hard disk as a magnetic recording medium will be explained with reference to FIGS. 10, 11, and 12.

As in the first embodiment, as shown in FIG. 10, an atmospheric pressure is utilized for bringing the hard disk 101 and the master information carrier 102 into contact with each other, which are mechanically pressed further to contact with each other, thus ensuring an entire and uniform contact between them. Then, the ferromagnetic film on the protruding portions of the embossed pattern formed on the master information carrier 102 is magnetized using the second magnetic head 106, thus recording preformat information signals corresponding to the embossed pattern into the hard disk 101. The recording process will be explained in detail as follows.

Before recording the information signals using the master information carrier 102, initial magnetization is carried out. As shown in FIG. 12, electric current is applied to the coil 121a and a large magnetic head 121 is rotated in parallel to the hard disk 101 about a center axis 122 of the hard disk 101, which is indicated with an alternating long and short dash line, with the gap 121b being positioned close to the hard disk 101, thus initializing the hard disk 101 (initial magnetization). In this case, the large magnetic head 121 may be replaced with the permanent magnet 81 as shown in FIG. 8. The large magnetic head 121 may have the same shape as that of the large magnetic head 106 used in recording preformat information signals. The direction of the magnetic field generated at the gap 121b of the large magnetic head 121 may be the same as or opposite to that of the magnetic field in recording the preformat information signals. In the second embodiment, they are opposite. The direction of the magnetic field generated at the gap 121b is determined depending on the direction for applying the current to the coil 121a. Therefore, in the second embodiment, the direction of the current applied to the coil provided for the large magnetic head 106 used in recording preformat information signals is opposite to that of the current applied to the coil 121a.

As shown in FIG. 10, the elastic plate 107 and the hard disk 101 are superposed on the lower plate 103 sequentially so that the face of the master information carrier 102 on which the embossed pattern are formed and the hard disk 101 are in contact with each other.

As a next step, the air suction device 109 is started. Air between the master information carrier 102 and the hard disk 101 is sucked out through the center hole 101a of the hard disk 101 and the center hole 107a of the elastic plate 107, and therefore the master information carrier 102 is forced toward the hard disk 101. An atmospheric pressure acts on the center portion of the master information carrier 102. In this condition, only the vicinity of the center portion of the master information carrier 102 is securely in contact with the hard disk 101, and the master information carrier 102 and the hard disk 101 may not be in secure contact with each other at their periphery. In order to obtain a secure contact between them at their periphery, the upper flange 104 is placed on the upper surface of the master information carrier 102 at the periphery. The upper flange 104 and the lower plate 103 are fixed with the bolts 105. In this case, by adjusting the fastening torque of the bolts 105, the hard disk 101 and the master information carrier 102 are pressed and come into contact with each other suitably, resulting in a uniform contact between them. Finally, the large magnetic head 106 is rotated in parallel to the master information carrier 102 about the alternating long and short dash line shown in FIG. 10, thus applying a direct excitation magnetic field to the master information carrier 102. Consequently, the ferromagnetic film on the protruding portions of the master information carrier 102 is magnetized, thus recording preformat information signals corresponding to the embossed pattern into the hard disk 101.

As described above, according to the second embodiment, the direction of the magnetic field generated at the gap in the large magnetic head 106 is perpendicular to the track-scanning orbit of the recording/reproducing magnetic head provided in the magnetic recording/reproducing apparatus. Therefore, in magnetizing the ferromagnetic film on the protruding portions of the master information carrier 102, its magnetized direction and the head-gap length direction of the recording/reproducing magnetic head are allowed to coincide with each other. It enables the preformat recording that permits sufficient reproduction amplitude for track-scanning by the recording/reproducing magnetic head to be obtained.

INDUSTRIAL APPLICABILITY

According to the present invention, the magnetized direction of recorded bits of preformat information signals in a magnetic recording medium can coincide with a head-gap length direction of a magnetic head provided in a magnetic recording/reproducing apparatus for reproducing the information signals recorded in the magnetic recording medium. It enables the preformat recording that permits sufficient reproduction amplitude for track-scanning by the recording/reproducing magnetic head to be obtained.

What is claimed is:

1. A master-information magnetic recording apparatus for recording predetermined information signals into a magnetic recording medium having a ferromagnetic layer, by using a master information carrier comprising a substrate on which a ferromagnetic film pattern corresponding to predetermined information signals is formed, comprising:

a support for holding a magnetic recording medium in contact with the master information carrier;

means for applying a magnetic field to the master information carrier to magnetize the ferromagnetic film pattern, the direction of the applied magnetic field being parallel to a surface of the master information carrier and being perpendicular to a circular-arc path on the magnetic recording medium along which a magnetic head scans tracks in a magnetic recording/reproducing apparatus into which the magnetic recording medium is installed.

2. The master-information magnetic recording apparatus according to claim 1, wherein said means for applying a magnetic field is a bar-like permanent magnet with a center axis curved along the circular-arc orbit and its magnetizing direction is perpendicular to the center axis.

3. The master-information magnetic recording apparatus according to claim 1, wherein said means for applying a magnetic field is a magnetic head having a pair of bar-like magnetic bodies opposing each other between which a center axis curved along the circular-arc orbit is located and a coil wound around at least one of the bar-like magnetic bodies, and the direction of a magnetic field generated by applying current to the coil is perpendicular to the center axis.

4. A method of recording predetermined information signals into a magnetic recording medium having a ferromagnetic layer, comprising the steps of:

preparing a master information carrier comprising a substrate on which a ferromagnetic film pattern corresponding to predetermined information signals is formed, holding a magnetic recording medium in contact with the master information carrier;

applying a magnetic field of the master information carrier to magnetize the ferromagnetic film pattern, the direction of the applied magnetic field being parallel to a surface of the master information carrier and being perpendicular to a circular-arc path on the magnetic recording medium along which a magnetic head scans tracks in a magnetic recording/reproducing apparatus into which the magnetic recording medium is installed.

* * * * *